Nov. 28, 1967     R. K. COOPER     3,355,141
VALVE HANDLES
Filed Dec. 9, 1964     2 Sheets-Sheet 1
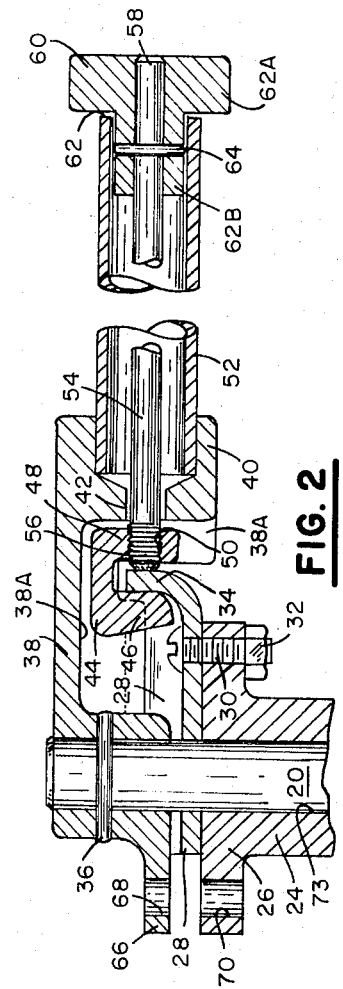
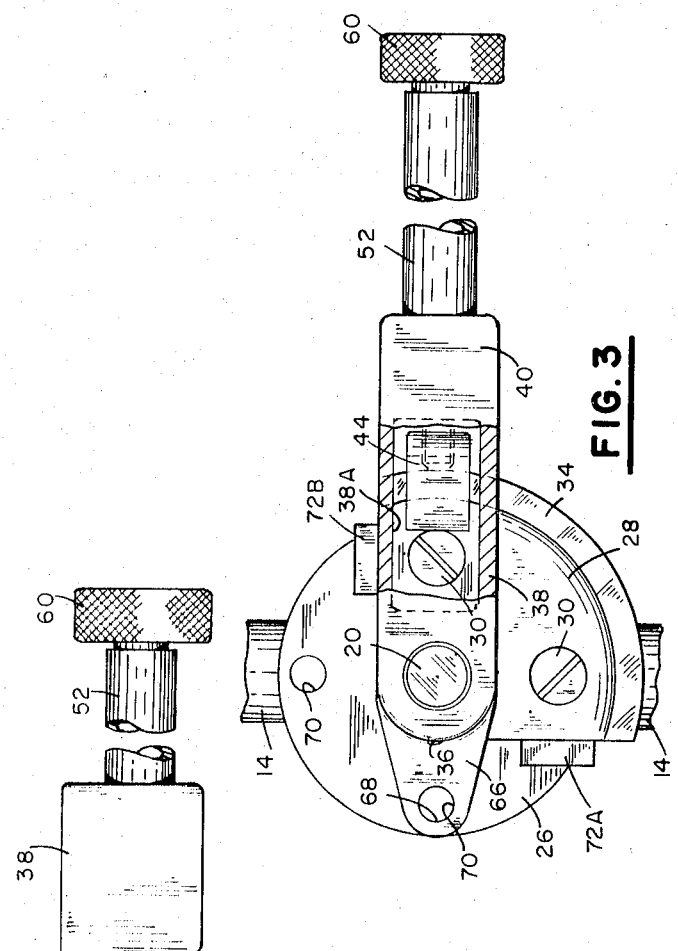
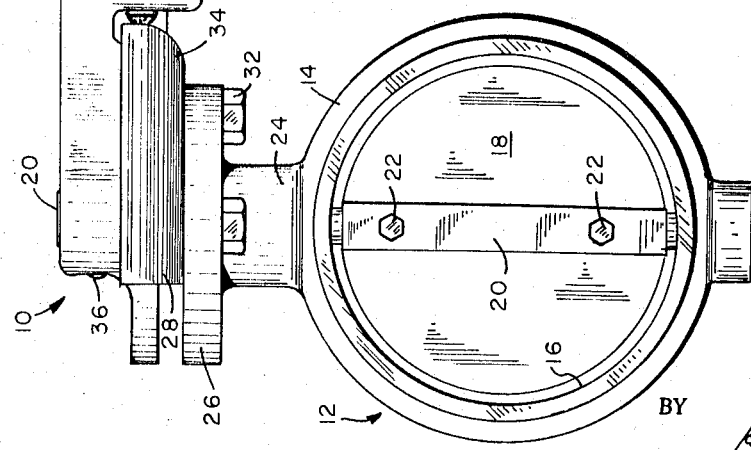
INVENTOR.
ROBERT K. COOPER
BY *Head & Johnson*
ATTORNEYS

United States Patent Office 3,355,141
Patented Nov. 28, 1967

3,355,141
VALVE HANDLES
Robert K. Cooper, Tulsa, Okla., assignor to The Hale Company, Tulsa, Okla., a corporation of Ohio
Filed Dec. 9, 1964, Ser. No. 417,170
9 Claims. (Cl. 251—101)

This invention relates to handles for valves. More particularly, the invention relates to a handle for a valve providing means of rotatably positioning the valve stem and at the same time affording means of maintaining the stem in any rotated position in such a manner that no lateral force is applied to the stem. In a still more limited sense, the invention relates to a valve having a rotatable valve stem including a handle whereby the valve stem may be rotatably positioned and locked in position without lateral force on the stem.

Many types of valves as utilized in industry today are of the type requiring the rotation of a valve stem through approximately 90° to move the valve from opened to closed position or vice-versa. A typical type of such valves is the butterfly valve which has achieved widespread application due to its simplicity, dependability and economy of construction. The valve handle of this invention will be disclosed and described as is applicable to controlling the rotational position of a disc in a butterfly valve, it being understood that the handle is equally adaptable to other types of valves.

A butterfly valve typically consists basically of a body having a flow passageway therethrough and a disc pivotally supported in the flow passage to open or close the flow passageway according to the rotatable position in the passageway. A valve stem is affixed to the disc and extends externally of the valve body to provide means by which the valve disc is externally positionable. To complete and make usable, the valve must include some type of handle externally of the valve for rotatably positioning the stem and thereby the valve disc. It can be seen that if all that is required is some means of rotating the valve disc from one position to another, such can easily be accomplished by a wrench or a laterally extending elongated member simply affixed in its inward end to the valve stem. Such arrangements, however, do not provide any means for maintaining the valve stem in desired positions. When a butterfly valve is utilized for throttling purposes, that is, when it is desired to maintain the valve disc at some intermediate position between open and closed, it is necessary that the valve handle have means of locking the stem and disc in any selected rotatable position.

Many types of valve handles have been suggested but all of the known types of handles are not completely successful because: (1) they can position the valve disc in only a limited number of preselected positions, that is, they engage notches, or so forth, to hold the disc in position; (2) if they can maintain the valve disc in a large number of preselected positions, in doing so they apply a lateral force to the valve stem; or (3) while overcoming the first two mentioned objections, they are complicated, difficult to manufacture, expensive and hard to use.

It is therefore an object of this invention to provide a handle for a valve capable of positioning the valve in an unlimited number of positions in a manner such that no lateral force is applied to the valve stem.

Another object of this invention is to provide a valve handle which is economical to manufacture and assemble, durable, and simple in operation.

Another object of this invention is to provide a valve handle including means whereby the valve may be locked in certain preselected positions or, at the option of the user, in any number of intermediate positions.

Another object of this invention is to provide a handle for a butterfly valve which, in one embodiment, limits the rotation of the handle and thereby the valve disc to 90° from fully open to fully closed position and, in another embodiment, limits the rotation of the handle and valve disc to 180° permitting the valve to be fully closed in two positions.

Another object of this invention is to provide a handle for a valve, such as a butterfly valve, including means whereby the valve disc is retained in position by a spring detent, particularly characterized by the arrangement whereby the spring imposes no lateral thrust on the valve stem.

These and other objects and a better understanding of the invention may be had by referring to the following description and claims taken in conjunction with the attached drawings in which:

FIGURE 1 is an external view of a butterfly valve having the handle of this invention.

FIGURE 2 is a fragmentary cross-sectional view of the upper portion of FIGURE 1 which includes the handle of this invention.

FIGURE 3 is a top view of the valve of FIGURE 1 showing the handle portion partially cut-away.

Figure 5:
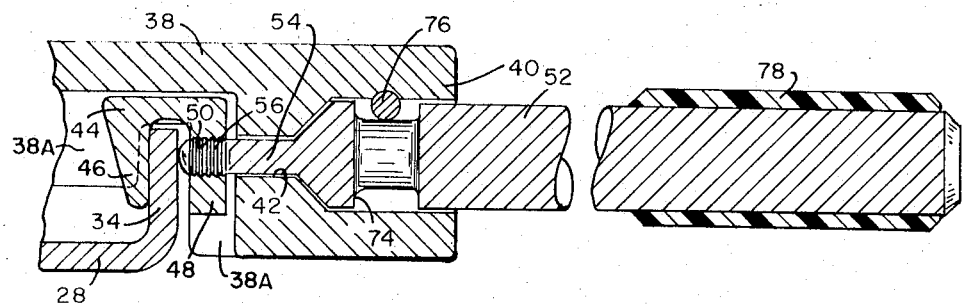
FIGURE 5 is a partial cross-sectional view of an alternate embodiment of the invention contrasted to FIGURE 2; in this embodiment the entire handle is rotated to lock or unlock the valve.

This invention may be described as a handle for a valve. More particularly, but not in the way of limitation, the invention may be described as a handle for a vale having a body and a stem extending through the body, the handle providing means to lockably rotatably position the stem relative to the body, the handle being comprised of a segmented cup member affixed to the exterior of the valve body adjacent the stem and having an integral outer tubular portion coaxial with the stem, a handle member affixed perpendicular to the stem and having a recessed opening in the lower surface, a portion of the handle member lying exteriorly of the tubular portion of the cup member, such exterior portion of the handle member having an opening therein, a clamp member loosely received in the recessed opening in the handle member, the clamp member having parallel legs straddling the tubular portion of the cup segment, the exterior leg having a threaded opening therein aligned with the opening in the handle member, a tubular handle extension affixed at its inner end to the handle member coaxially with the opening therein, the handle extension being substantially perpendicular to the stem, a shaft rotatably supported within the handle extension and the opening in the handle member, the inner end of the shaft being threaded and received in the threaded opening in the clamp member outer leg to engage the tubular portion of said cup member, when inwardly threadably advanced, and a knob affixed to the outer end of the shaft member exteriorly of and adjacent the outer end of the handle extension.

Referring now to the drawings and first to FIGURE 1, the handle of this invention is shown in external view and designated by the numeral 10, the handle being shown affixed to a valve generally indicated by the numeral 12. Valve 12 is a typical butterfly valve and, as has been perviously indicated, the invention will be described as applied to a butterfly valve, however, it is understood that such is by way of example only and that the handle of this invention may be equally applied to other types of valves.

The valve 12 consists basically of valve body 14 having a flow passageway 16 therethrough. Pivotally supported in the flow passageway 16 is a disc member 18 which, when rotated to the closed position shown, closes the fluid passageway 16 and when rotated 90° thereof opens the fluid passageway. The disc 18 is pivotally supported by a valve stem 20, the disc being affixed to the stem by bolts 22. The valve body 14 includes an integral boss portion 24 through which the stem 20 extends externally of the valve. This invention provides a means of externally controllably positioning the valve stem 20. Boss portion 24 of the valve terminates in an upper integral flange portion 26, the stem 20 extending past the upper end of the flange 26.

The valve 12 described to this point is a standard butterfly valve. An exemplary embodiment of the handle of this invention, as it is typically applied to the valve 12, will now be described by reference to FIGURES 1, 2 and 3. A segmented cup member 28 is supported to the flange 26 by means of bolts 30 and nuts 32. The segmented cup member 28 has an integral outer tubular portion 34 coaxial with the stem 20. The member 28 is described as segmented since in the embodiment shown it is a segment of a cup shaped member. However, it can be seen that the member 28 can be completely cylindrical so that the portion 34 would be completely tubular coaxial with the stem 20. Since butterfly valves, as well as many other types of valves, rotate only 90° from fully open to fully closed position, only a segmented member 28 is required, however, it is to be understood that by the term "segmented cup member" is included a member having a tubular portion 34 which may be as small as desired or up to a full 360° tubular member.

Affixed to and extending substantially perpendicularly of upper end of stem 20, such as by means of pin 36, is a handle member 38 having a recessed opening 38A formed in the lower surface. A portion 40 of the handle member 38 extends exteriorly of the tubular portion 34 of segmented cup member 28, the portion 40 being provided with an opening 42 therein.

Straddling the tubular portion 34 of the segmented cup member 28 is a shoe of clamp member 44 having an inner-leg 46 and an outer-leg 48. The space between the inner and outer legs 46 and 48 exceeds the width of the tubular portion 34 so that the clamp member 44 is slidable on the tubular portion. A threaded opening 50 is provided in the outer leg 48 in alignment with the opening 42 in the handle member 38. Affixed to the handle member 38 is a tubular handle extension 52 coaxial with the opening 42. It can be seen that the handle extension 52 can be integral with the handle member 38 and as described and defined herein it is understood that members 38 and 52 may be integral or separate components without departing from the scope of the invention. The handle extension 52 extends substantially perpendicularly of the stem 20.

Rotatably supported within the handle extension 52 and the opening 42 in handle member 38 is a shaft 54 having threads 56 at the inner end. The threads 56 engage the threaded opening 50 in the outer leg 48 of clamp member 44. Affixed to the outer end 58 of the shaft 54 is a knob 60 which preferably is immediately adjacent to the outer end 62 of the handle extension 52. The knob 60 includes an outer portion 62A which preferably is larger in diameter than the handle extension 52 and is provided with a knurled surface. The knob 60 may be further defined by an inner reduced diameter portion 62B which is rotatable in the tubular handle extension 52, the inner knob portion serving more or less as a bearing for supporting the shaft 54. A pin 64 provides one means of connecting the inner end 62B of knob 60 to the outer end 58 of shaft 54.

In the embodiment shown the handle member has an integral portion 66 which extends parallel and adjacent to the valve flange 26. The portion 66 is provided with an opening 68 and in like manner the valve flange 26 is provided with openings 70. The number of openings 70 in the flange may vary according to the desire of the manufacturer. The openings 68 and 70, when aligned, may receive a lock whereby the valve may be locked in a preselected position to prevent accidental or unauthorized movement of the handle. In FIGURE 3, openings 70 are shown only for the fully opened and fully closed positions of the valve, however, it can be seen that intermediate openings may be provided if desired. The opening 70 may be simply used to receive a bolt as a safeguard against the valve being accidentally moved from preselected positions.

When knob 60 is rotated, the shaft 54 is threadably advanced so that the inner threaded end 56 engages the exterior surface of the tubular portion 34 of segmented cup member 28. This threaded engagement forces the inner leg 46 of clamp 44 against the interior surface of the tubular portion 34 so that the clamp member is firmly held in contact with the tubular portion 34. This prevents the handle member 38 and thereby the valve stem 20 from rotating. When it is desired to change the position of the disc member in the valve, the user merely rotates the knob 60 a fraction of a turn to release the clamp 44 and thereby permits it to slide freely upon the tubular portion 34 of the cup member 28. With the clamp member released the handle may be moved to any desired position.

As best shown in FIGURE 3, the segmented cup member 28 is provided with integral upturned stop portions 72A and 72B which limit the rotation of the valve handle about the stem 20.

It can be seen that regardless of how much force is applied to knob 60 as it is rotated to force the clamp member 44 against the tubular portion 34 no lateral force whatsoever is applied to the valve stem 20. That is, the shaft 54, knob 60 and clamp member 44 are freely longitudinally positionable relative to the valve handle 38 and the extension 52. The valve stem 20, by the handle of this invention, is merely rotated or prevented from being rotated by the handle and no force is applied by the handle to laterally displace the stem relative to the valve body boss portion 24. This is very important in the successful operation of valves, and such importance is fully appreciated by designers of butterfly and other types of valves which pivot about an externally extending valve stem. With any type of handle where lateral force is applied, wear soon occurs in the valve body at the stem receiving opening 73, and in the stem itself. This wear has two serious effects. First, it affords opportunity for leakage along the valve stem. Second, and most important, it causes displacement of the valve disc 18 from its critical axial position within the flow passageway. Even slight displacement may permit leakage of fluid past the valve disc 18 and therefore failure of the valve. An additional advantage of the handle of this invention is that no matter how tightly it is locked, no force is applied to displace the valve disc vertically.

Figure 4:
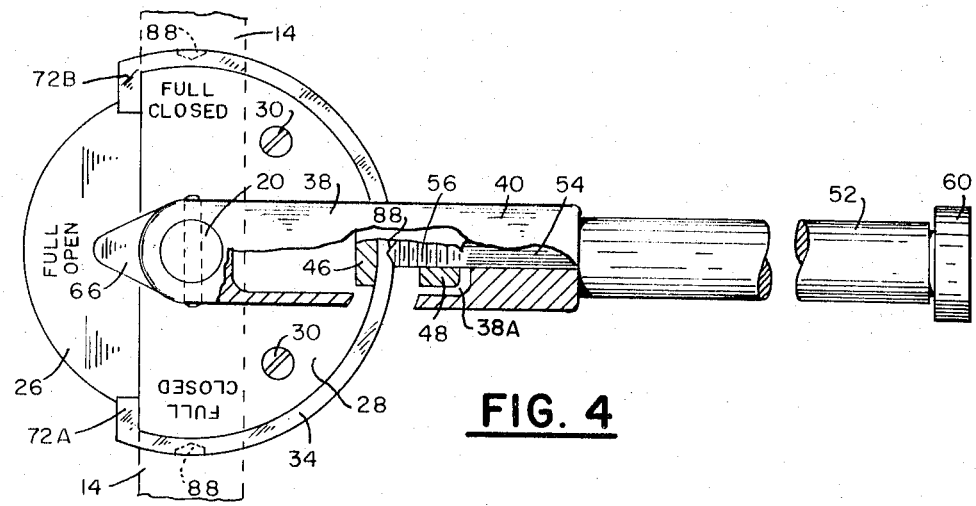
FIGURE 4 is a top view shown partially in cut-away, similar to that of FIGURE 3, showing an arrangement whereby the handle can rotate the valve stem through 180° so that the valve can be closed in two different positions.

FIGURE 4 is an alternate arrangement of the invention wherein the handle may be rotated a total of 180°. The tubular portion 34 of segmented cup member 28 encompasses more than 180° and is terminated at the ends by stop portions 72A and 72B. This arrangement, particularly when the handle is used with a butterfly valve, permits the valve to be closed by movement of the handle in either direction from the fully open position (as shown). The integral portion 66 is shortened to avoid engagement with the stops and serves as a pointer to indicate the valve position.

FIGURE 5 shows an alternate arrangement in which the handle extension 52 is rotated to lock and unlock the valve. In this embodiment, shaft 54 having the threaded end 56, is integrally affixed with extension portion 52. A groove 74 is formed in handle extension 52, the extension being rotatably supoprted in handle member 38. A key pin 76 in handle member 38 limits the axial movement of handle 52 to the required amount, while permitting it to rotate. A plastic grip portion 78 may be provided at the outer end of the handle extension. The arrangement of FIGURE 5 functions the same as described with reference to FIGURES 1 through 4 except that handle extension 52 is used both to rotate the valve stem and to lock it in any selected position.

Figure 6:
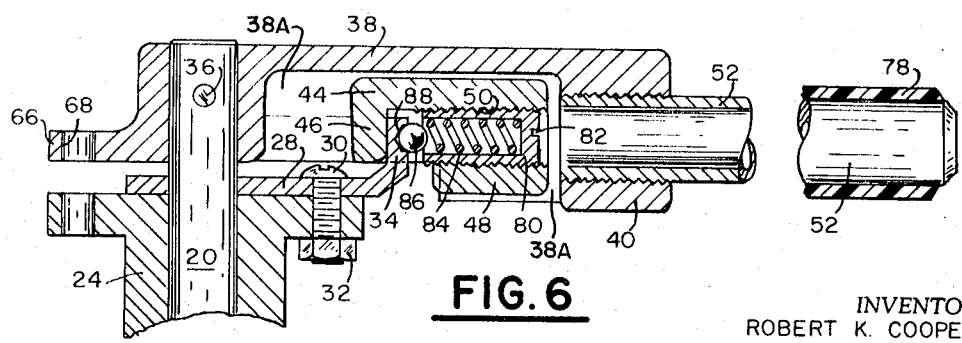
FIGURE 6 is a cross-sectional view of the handle showing an alternate embodiment of the invention utilizing a spring detent arrangement to maintain the valve in preset positions.

Another alternate embodiment of the invention is shown in FIGURE 6. In this embodiment the handle does not "lock" the valve in position but retains it in preselected positions by a spring detent means. The shoe or clamp member 44 has, in the outer leg portion 48, a threaded opening 50 which is preferably larger in diameter and longer than required in the hitherto discussed embodiments. An externally threaded tubular spring retainer 80 is positioned in opening 50. The spring retainer 80 is closed at the outer end and is provided with a screw driver slot 82. A coiled spring 84 is positioned within the tubular retainer 80 urging a ball 86 against the exterior of the tubular portion 34 of the segmented cup member 28. Formed in the exterior cylindrical surface of the cup member 28 are detent recesses 88 (see also FIGURE 4) at the positions where it is desired that the valve be positioned. As many of the detent recesses 88 as desired may be provided, provisions to retain the valve in fully closed and fully opened positions being the obvious basic requirements. Handle extension 52 is threaded to handle member 38. When necessary to adjust the spring retainer 80 to apply more or less spring force against ball 86 handle 52 is removed, exposing the end of the spring retainer 80 having the screw driver slot 82.

The embodiment of FIGURE 6 has advantages and limitations over the other illustrated embodiments. In this arrangement handle extension 52 does not have to be rotated to unlock the valve handle to permit the rotation of the valve stem from one position to another, and upon reaching the desired setting, the handle does not have to be rotated to lock the valve in position. On the other hand, the arrangement of FIGURE 6 precludes positively locking the valve in position. The primary advantage of the valve handles of this invention is retained in the FIGURE 6 embodiment, that is, there is no lateral force applied to valve stem 20. Regardless of how much force spring 84 exerts, no force is applied against the stem because the clamp member 44 is loosely retained within the recess 38A in handle housing 38 and is not affixed to it.

This invention provides a valve handle which has the following salient features:

First, the handle is extremely simple of construction, design, manufacture, and use. Second, the handle is effective to position a valve stem of a valve at any of an unlimited number of positions. Third, the handle provides means whereby the stem may be locked by two different means against undesired rotation. Fourth, and most important, the handle of this invention provides means whereby the stem may be locked against rotation in such a manner that no lateral force is applied to the stem relative to the valve body.

Although this invention has been described with a certain degree of particularity it is manifest that many changes may be made in the details of construction and the arrangement of components without departing from the spirit and the scope of this disclosure.

What is claimed:

1. In combination
   a valve body having a flow passageway therethrough and a stem opening therein;
   a closure member rotatably supported in said flow passageway adaptable in one rotatable position to close said passageway and in another position to open said passageway;
   a valve stem affixed at one end to said closure member, the other end extending sealably and rotatably through said valve body stem opening;
   a segmented cup member affixed to the exterior of said valve body adjacent said stem opening, the segmented cup member having an integral outer tubular portion coaxial with said stem opening;
   a handle member affixed to said valve stem exterior of said valve body and extending substantially perpendicular of said valve stem, a portion of the handle member lying exteriorly of said tubular portion, the handle member having a recess in the lower surface thereof;
   an inverted U-shaped clamp member having parallel leg portions straddling said tubular portion of said cup segment, the leg portion furthest from the valve stem having a threaded opening therein, the clamp member loosely received in said recess in said handle member; and
   means in said threaded opening in said clamp member forcibly engaging the exterior tubular surface of said segmented cup member to nonslidably retain said clamp member and thereby said handle member in a preselected position.

2. In combination
   a valve body having a flow passageway therethrough and a stem opening therein;
   a closure member rotatably supported in said flow passageway adaptable in one rotatable position to close said passageway and in another position to open said passageway;
   a valve stem affixed at one end to said closure member, the other end extending sealably and rotatably through said valve body stem opening;
   a segmented cup member affixed to the exterior of said valve body adjacent said stem opening, the segmented cup member having an integral outer tubular portion coaxial with said stem opening;
   a handle member affixed to said valve stem exterior of said valve body and extending substantially perpendicular of said valve stem, a portion of the handle member lying exteriorly of said tubular portion, the handle member having a recess in the lower surface thereof;
   an inverted U-shaped clamp member having parallel leg portions straddling said tubular portion of said cup segment, the leg portion furthest from the valve stem having a threaded opening therein, the clamp member loosely received in said recess in said handle member; and
   a shaft member rotatably extending through said opening in said handle member, the shaft member having threads at one end thereof threadably engaging the threaded opening in said clamp member, the threaded end of said shaft member engaging said tubular portion as the shaft member is inwardly threadably advanced.

3. The combination of claim 2 wherein said valve body includes
   an integral boss portion having said valve stem opening therein, the boss portion terminating in
   an outer integral flange portion to which said segmented cup member is affixed, said flange portion having at least one opening spaced from and substantially parallel said stem opening and wherein said handle member has an integral portion extending substantially parallel to and adjacent said flange portion, said handle member portion having an opening therein aligning when said handle member is rotated to a preselected position with said openings in said boss portion flange portion.

4. The combination of claim 2 including
   a tubular handle extension affixed at the inner end to said handle member in axial alignment with said opening in said handle member, said shaft member rotatably supported within said handle extension; and
a knob member affixed to said shaft member at the outer end thereof and exteriorly of said handle extension.

5. For use with a valve having a valve body and a valve stem extending through the valve body, a handle comprising:
   a segmented cup member affixed to the exterior of the valve body adjacent the stem and having an integral outer tubular portion coaxial of said stem;
   an elongated handle member affixed perpendicularly to the valve stem, a portion of the handle member lying exteriorly of the tubular portion of said cup member tubular portion, such portion of the handle member having an opening therein;
   a clamp member having parallel legs straddling said tubular portion of said cup segment, the exterior tubular portion of said cup segment, the exterior having a threaded opening therein aligned with the opening in said handle member; and
   a shaft member rotatably carried by said handle member and extending through said opening therein, the inner end of the shaft member being threaded and threadably engaging said threaded opening in said clamp member exterior leg, the inner end of said shaft member engaging said tubular portion of said cup member when threadably inwardly advanced to prevent the rotation of said handle member and thereby said valve stem.

6. With a valve having a body and a stem extending through the body, a handle to lockably rotatably position the stem relative to the body, comprising, in combination:
   a segmented cup member affixed to the exterior of the valve body adjacent the stem and having an integral tubular portion coaxial with said stem;
   a handle member affixed perpendicularly to said valve stem, a portion of the handle member lying exteriorly of the tubular portion of said cup member, such exteriorly extending portions of the handle member having an opening therein, and the handle member having a recess in the lower surface thereof;
   a clamp member having parallel legs straddling said tubular portion of said cup segment, the exterior leg having a threaded opening therein aligned with the opening in said handle member, the clamp member loosely received in said recess in said handle member; and
   a tubular extension rotatably supported at its inner end to said handle member coaxially with said opening therein, said handle extension being substantially perpendicular to said stem, the inner end of said handle member terminating in a reduced diameter extension received by said opening in said handle member, the inner end of said reduced diameter extension being threaded and received in said threaded openings in said clamp member outer leg to engage said tubular portion of said cup member.

7. With a valve having a body and a stem extending through the body, a handle to lockably rotatably position the stem relative to the body, comprising, in combination:
   a segmented cup member affixed to the exterior of the valve body adjacent the stem and having an integral tubular portion coaxial with said stem;
   a handle member affixed perpendicularly to said valve stem, a portion of the handle member lying exteriorly of the tubular portion of said cup member, such exteriorly extending portion of the handle member having an opening therein, and the handle member having a recess in the lower surface thereof;
   a clamp member having parallel legs straddling said tubular portion of said cup segment, the exterior leg having a threaded opening therein aligned with the opening in said handle member, the clamp member loosely received in said recess in said handle member;
   a tubular handle extension affixed at its inner end to said handle member coaxially with said opening therein, said handle extension being substantially perpendicular to said stem;
   a shaft rotatably supported within said handle extension and said opening in said handle member, the inner end of said shaft being threaded and received in said threaded openings in said clamp member outer leg to engage said tubular portion of said cup member; and
   a knob affixed to the outer end of said shaft member exterior of and adjacent the outer end of said handle extension.

8. With a valve having a body and a stem extending through the body, a handle to lockably rotatably position the stem relative to the body, comprising, in combination:
   a segmented cup member affixed to the exterior of the valve body adjacent the stem and having an integral tubular portion coaxial with said stem;
   a handle member affixed perpendicularly to said valve stem, a portion of the handle member lying exteriorly of the tubular portion of said cup member, the handle member having a recess in the lower surface thereof;
   a clamp member having parallel legs straddling said tubular portion of said cup segment, the exterior leg having an opening therein substantially perpendicular the cup member tubular portion, the clamp member loosely received in said recess in said handle member;
   a handle extension affixed at its inner end to said handle member, said handle extension being substantially perpendicular to said stem;
   a coiled compressed spring in said opening in said clamp member outer leg; and
   a ball engaging the outer surface of said cup member tubular portion, the ball urged in such engagement by said spring.

9. A handle according to claim 8 wherein said opening in said clamp member outer leg is threaded, and including
   an externally threaded tubular spring retainer closed at its outer end and threadably positioned in said threaded opening in said clamp member outer leg, said spring being received by said spring retainer whereby the compression of said spring against said ball may be varied by the threaded movement of the spring retainer.

No references cited.

M. CARY NELSON, *Primary Examiner.*

R. C. MILLER, *Assistant Examiner.*